Patented Mar. 18, 1924.

1,486,961

UNITED STATES PATENT OFFICE.

PETER HASENCLEVER, OF HAMBURG-BILLWARDER, GERMANY.

MANUFACTURE OF CHROME ALUM.

No Drawing.   Application filed November 11, 1922.   Serial No. 600,452.

*To all whom it may concern:*

Be it known that I, PETER HASENCLEVER, a citizen of Germany, residing at 29 Billbrookdeich, Hamburg-Billwarder, Germany, have invented certain new and useful Improvements in the Manufacture of Chrome Alum, of which the following is a specification.

It has been known that ferrochromium (or generally the alloys of iron and chromium) may be dissolved in strong mineral acids, as sulphuric acid and hydrochloric acid and that one may prepare from the solution which contains a chromic and a ferrous salt, chrome alum by addition of potassium sulphate. In order to obtain chrome alum free of iron, it was necessary to separate a large part of the iron salt by crystallization before the addition of the potassium sulphate. This operation was tedious and did not guarantee a sure result. The chrome alum obtained by the said process is not sufficiently free of iron, as required for technical purposes.

The object of the present process is to prepare chrome alum free of iron from ferrochromium. The process consists in that one dissolves ferrochromium in a strong mineral acid as sulphuric acid or hydrochloric acid, adding agents precipitating metal hydroxides in such amount that only chromium hydroxide is precipitated, the iron remaining dissolved, separating the precipitated chromium hydroxide from the liquid, washing the chromium hydroxide, dissolving it in sulphuric acid and adding potassium sulphate to the solution.

The process is based on the new observation that from a solution of chromic and ferrous salts firstly chromium hydroxide is precipitated and that only after the separation of chromium hydroxide the precipitation of ferrous hydroxide begins. It is possible to obtain a sufficiently complete precipitation of chromium hydroxide without ferrous hydroxide and to prepare from the pure chromium hydroxide chrome alum free of iron. As the previous crystallization of ferrous sulphate, necessary in the known processes is suppressed the present process may be carried out in a shorter time. As precipitating agents for the chromium hydroxide one may use the hydroxides of alkali metals or alkaline earth metals or the carbonates of alkali metals.

*Example.*—100 kilograms ferrochromium are dissolved in about 300 kilograms concentrated sulphuric acid or in about 580 kilograms concentrated hydrochloric acid, the solution is heated to about 100 degrees centigrade and mixed with about 200 kilograms sodium carbonate, preferably dissolved in a suitable quantity of water. In the place of sodium carbonate one may use 127 kilograms calcium hydroxide. The precipitated chromium hydroxide is separated from the liquid, for instance by decantation or filtration, pressed, washed with water, preferably until the water does not dissolve salts, dissolved in sulphuric acid and mixed with the amount of potassium sulphate equivalent to the chromium in the solution. One brings then the chrome alum to crystallization. From the ferrous sulphate containing liquid one may prepare by concentration and crystallization ferrous sulphate.

I claim:—

The process for manufacturing chrome alum which consists in dissolving ferrochrome in a non-oxidizing mineral acid capable of dissolving ferrochrome, precipitating from the solution chromium hydroxide, the iron remaining dissolved, separating the chromium hydroxide from the liquid, dissolving the chromium hydroxide in sulphuric acid, adding potassium sulphate and crystallizing.

In testimony whereof I hereunto affix my signature.

PETER HASENCLEVER.